Sept. 26, 1967 H. F. KINKEL ETAL 3,344,387

VARIABLE THIN FILM ELECTRICAL COMPONENT

Filed Oct. 7, 1964 2 Sheets-Sheet 1

INVENTORS
H.F. KINKEL JR.
E. RADETSKY

BY A. J. Nugent
ATTORNEY

VARIABLE THIN FILM ELECTRICAL COMPONENT

Filed Oct. 7, 1964 2 Sheets-Sheet 2

United States Patent Office 3,344,387
Patented Sept. 26, 1967

3,344,387
VARIABLE THIN FILM ELECTRICAL COMPONENT

Henry F. Kinkel, Rutherford, and Eugene Radetsky, New York, N.Y., assignors to Western Electric Company Incorporated, New York, N.Y., a corporation of New York Filed Oct. 7, 1964, Ser. No. 402,274
4 Claims. (Cl. 338—314)

This invention relates to electrical components, for example thin film resistors, and more particularly to resistors for use in mass produced power equipment requiring resistances having a wide range of values.

In the past few years the thin film art has been expanding tremendously as the electronics industry as a whole continues to drive toward miniaturization of components. In view of the small size of the miniaturized components, the use of thin film devices has been limited largely to low current applications. Therefore, heat considerations have not been dominant in thin film resistor designs. In power applications where a large current is sent through a circuit where relatively large resistances are in use, resulting in relatively high operating temperatures, reliance has still been placed on costly wound resistors.

One problem which arises in thin film devices is the requirement of a variety of resistance values. In such cases, it became necessary to either fabricate as many different film units as different ohmic values required, or anodize a few existing film units to new resistance values. Both of these courses were and are prohibitively expensive when the needs of high-running complex units are considered.

Accordingly, it is an object of the present invention to provide new and improved electrical components wherein the magnitude of an electrical characteristic of a thin film circuit element thereof is selectively variable without alteration of the elemental structure of the element.

It is a further object of this invention to provide a component of the thin film type which is able to withstand the heat generated during use in a high power system.

It is a further object of this invention to provide an electrical component which, due to its simplicity of design, is readily adaptable to an automated manufacturing process.

It is still another object of this invention to provide a thin film resistor which can be fabricated in a large plurality of resistance values without changing the basic make-up of the unit.

Broadly speaking, the invention is concerned with a resistor comprising an insulating body portion having a plurality of terminals affixed to one end thereof. A metallic heat sink is associated with the body portion, and at least one thin film module is mounted on the unit. An insulating cover containing printed circuit paths is fitted over the body portion to form the completed component.

In accordance with the objects, one embodiment of the instant invention may comprise a flat, non-conducting base member having three conductive land areas deposited at one end portion thereof, three terminals mounted to the base member at the land areas and extending from one end thereof, a metallic heat sink having a flat surface and a finned surface attached to the base with its finned surface resting thereagainst, a plurality of thin film modules deposited directly on the surface of the base member having the land areas, and a plastic molded cover which fits over the open side of the base member. The cover includes printed circuit paths on its under side which, therefore, face the thin film modules and the conductive land areas.

A second embodiment includes a plastic molded base member of shallow U-shaped configuration which has three conductive land areas deposited at one portion thereof, three terminals mounted to said base during molding in a manner such that they contact the land areas and extend from one end of the base, a metallic plate functioning as a heat sink mounted to the base, a plurality of non-conducting elements mounted on the heat sink, a thin film module mounted on each of said non-conducting elements, and a plastic molded cover which fits over the open side of the base member. The cover includes printed circuit paths on its under side which, therefore, face the film modules and the conductive land area.

In both of the above embodiments, each film module has a resistance path, the maximum resistance of which is set by the material, length and cross-sectional dimension of the film. A plurality of contacts are located along the resistance path of each module, and the printed circuitry of the cover includes printed contacts facing those on the module. By selection of any two of the plurality of contacts on the resistance path, a desired length of film can be designated for introduction into the circuit to give a desired resistance less than maximum resistance. This may be done with one or more of the modules on the component, the modules then being interconnected in any manner desired by the printed circuitry and contacts on the cover. The cover originally will be provided with paths to interconnect the modules, or portions thereof, in several different circuits, each resulting in a different resistance. The unwanted paths are removed from the cover selectively in accordance with the particular code desired.

These and other features, advantages and objects of the invention will be understood more fully upon a study of the following detailed description considered along with the accompanying drawings wherein.

Figure 1:
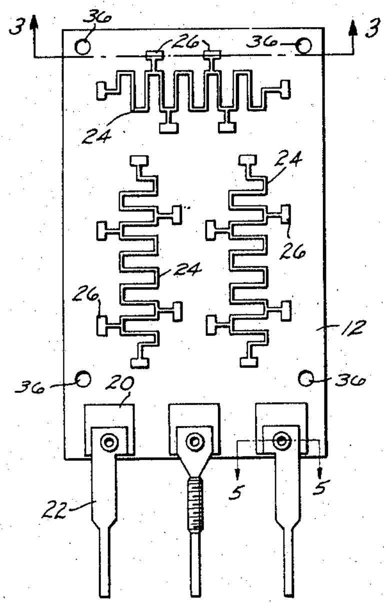
FIG. 1 is a plan view of the base member of the first embodiment of the invention, also showing the land areas, terminals, and film modules thereof.
Figure 2:
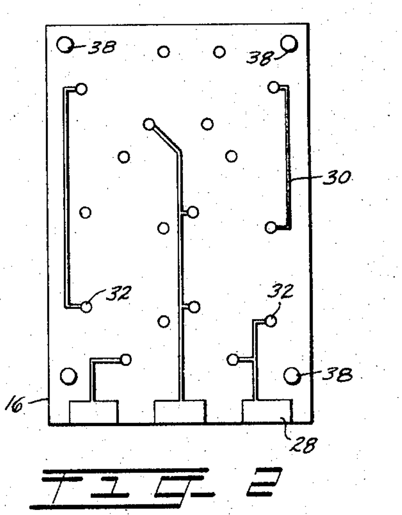
FIG. 2 is a plan view of the under side of the cover member associated with the base member of the first embodiment.

With reference to FIGS. 1–5 of the drawings, one embodiment of the invention comprises an electrical component which has two basic parts: a body member, which includes a base 12 and a heat sink 14, and a plastic cover member 16.

The base member 12 comprises a flat, rectangular element which is made of a non-conducting material such as alumina ceramic. Onto one end of the upper surface of base member 12 are deposited three land areas 20, the land areas being of conductive material such as gold, silver, copper or the like. Three terminals 22 are affixed to the base member, each terminal being attached at a land area. To insure positive conductive as well as physical attachment, the terminals are connected to the base member by a resistance-fusing machine. This machine sets and fuses an eyelet 23 (FIG. 5) which encompasses and holds a terminal 22 to a land area 20 and the base member 12. The terminals are tinned so when the resistance-fusing machine heats the eyelet area, the solder will flow, depositing a layer of solder between the eyelet and board, eyelet and terminal, and terminal and land area.

Sputtered directly on the base member 12 are a plurality of film circuit elements or modules 24, preferably made of tantalum. Three are shown but of course any number could be utilized within the scope of the invention. Each module includes a resistance path of predetermined maximum ohmic value, which is determined by the length, material and cross-sectional configuration of the element. Placed along the resistance path of each module are a plurality of contacts 26. Since the resistance of material of constant cross section is proportional to its length, by selecting two of the contacts 26, a desired length of the film can be selected for introduction into the circuit of a resistance less than the maximum. While tantalum is preferred, other film materials such as deposited carbon, chromium or nickel may be used.

The cover member 16 comprises a flat piece of plastic, rectangular in shape, adapted to fit over the base member 12 covering the land portions and thin film modules thereof. The cover includes three printed terminal areas 28 located at one end thereof and positioned so as to be selectively contactable with either the terminals 22 or the land areas 20. Cover 16 also includes a plurality of printed circuit paths 30 selectively connected to the terminal areas 28. Also located on the cover are a plurality of printed contacts 32 located so as to be respectively engageable with the contacts 26 of the base member. When the cover is placed over the base member, the printed terminal areas 28 of the cover selectively contact the conductive land areas 20 on the base member and the printed contacts 32 of the cover selectively engage the contacts 26 of the base member. The printed circuit paths leading from the terminal areas 28 to the printed contacts 32 on the cover form a circuit running from one of the plurality of terminals 22 through the printed circuit paths, the desired resistance length of the film modules, back through a printed circuit path to another of said terminals.

The make-up of cover member 16 readily lends itself to the manufacture of resistors having different ohmic values. This is accomplished by originally fabricating a cover with sufficient circuit paths and printed contacts to interconnect the modules or portions thereof in a plurality of series and or parallel arrangements. If resistors of a certain ohmic value are required, in a final state of manufacture, all circuit paths and contacts on the cover not needed in the interconnection of the modules necessary to effect that resistance are removed. This can be readily done by an etching process. If there is a change in resistor requirements so that an increased or decreased ohmic value is needed, the only required change in the entire process is to change the circuit paths being removed in the etching process, thereby resulting in a cover with a different circuit arrangement which will give a different resistance.

Figure 3:
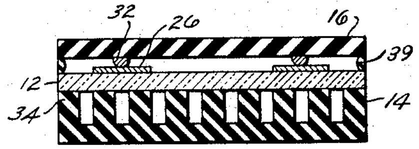
FIG. 3 is a cross-sectional view of the assembled component of the invention taken along line 3—3 of FIG. 1.
Figure 4:
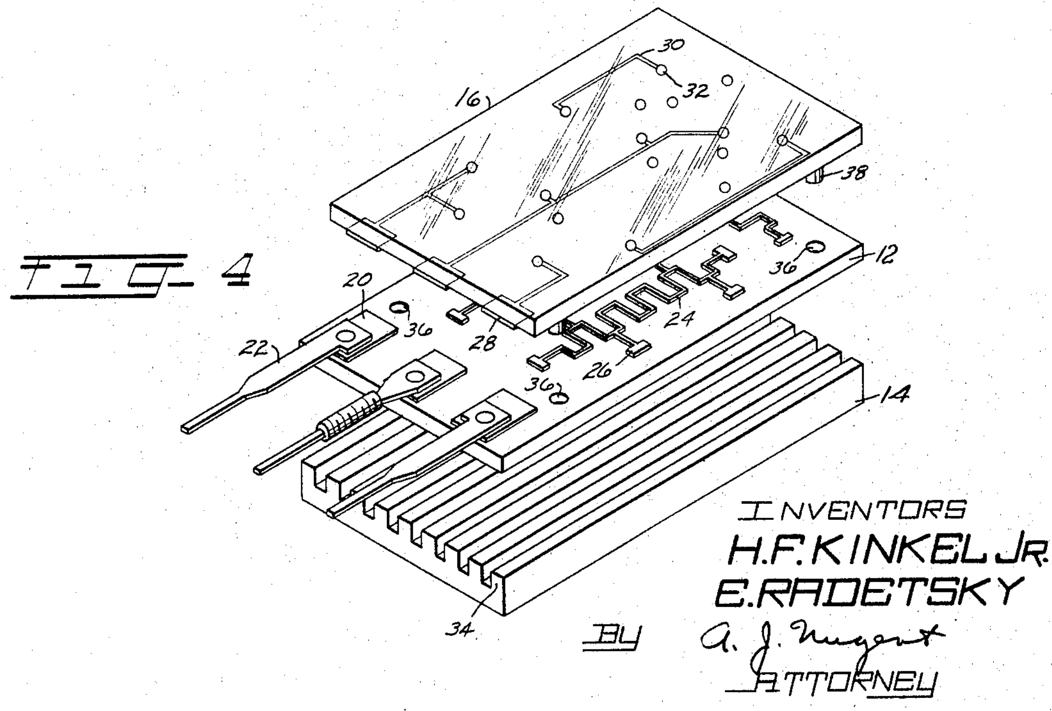
FIG. 4 is an exploded perspective view of the first embodiment of the invention.

To dissipate the large amounts of heat (temperatures of from 200° F. to 450° F. are reached) the metallic heat sink 14, preferably made of aluminum, but not restricted to that metal, is attached directly to base member 12. Heat sink 14 is provided with a plurality of fins 34 on its upper surface. When the heat sink is attached to the base member, it is attached with the fin surface in direct contact with the lower surface of base member 12 as shown in FIG. 3.

The base member, cover and heat sink can be made separately in independent manufacturing processes, the three completed parts being brought together for final assembly. The cover can be affixed to the base member by placing conductive adhesives on contacts 26 and printed contacts 32. Alternatively, a prong and socket arrangement, utilizing sockets 36 and prongs 38 can be employed. With the latter arrangement to change the resistance value of a resistor, it requires only removing one cover and replacing it with another having a different pattern of printed circuit paths.

The heat sink is attached to the base member by an adhesive, preferably one of a silicon base for heat resisting purposes. To complete the assembly, a filler material 39 is placed around the periphery of the junction of cover and base member to seal the component.

Figure 5:
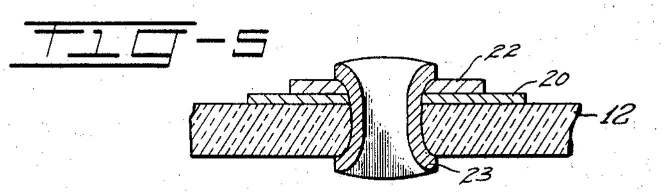
FIG. 5 is a sectional view taken along line 5—5 of FIG. 1.
Figure 6:
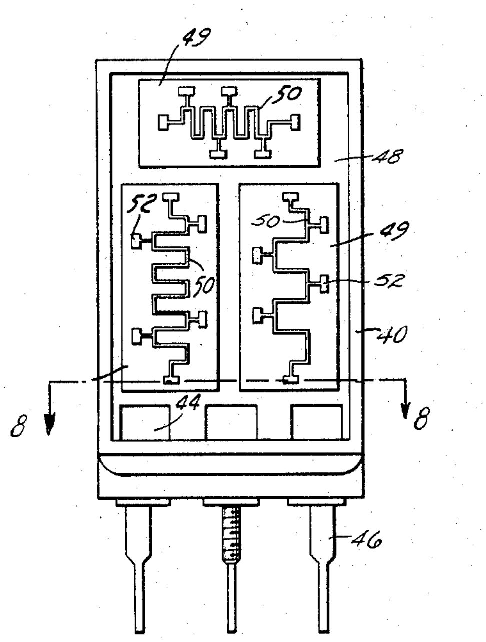
FIG. 6 is a top view of the second embodiment of the invention with the cover member removed.
Figure 7:
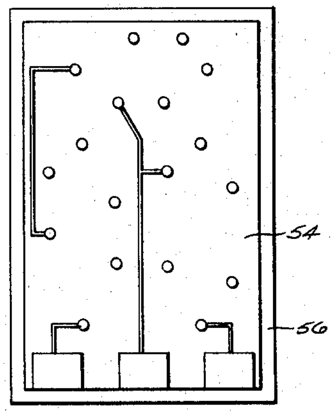
FIG. 7 is a plan view of the under side of the cover member of the second embodiment of the invention.
Figure 8:
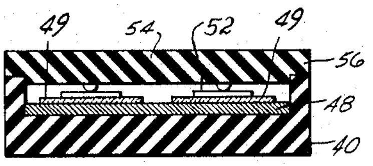
FIG. 8 is a cross-sectional view of the invention taken along line 8—8 of FIG. 6.
Figure 9:
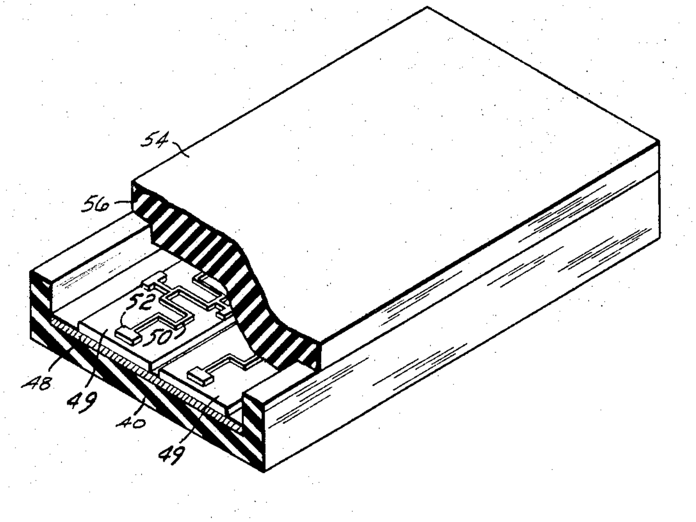
FIG. 9 is a perspective view of the second embodiment of the invention, broken away to more clearly show the make-up of the component.

Referring now to the embodiment of FIGS. 6–9, the invention comprises two basic parts: a body member, which includes a base 40, a heat sink 48 and non-conducting elements 49, and a cover 54. The plastic molded base 40 which has a shallow U-shaped cross-sectional configuration is shown in FIG. 8. Deposited at one end of base 40 are three conductive land areas 44, and three terminals 46 are attached to the base at the land areas thereof. The terminals can be attached by the same process described with relation to the first embodiment as shown in FIG. 5, or can be attached to the base during the molding operation. In this embodiment, the heat sink 48 is mounted directly on the upper surface of base 42, during the molding operation. Mounted on the heat sink are a plurality of rectangular elements 49 which may be made of any non-conducting material such as alumina ceramic. Three are shown, but any number could be utilized within the scope of the invention. Thin film circuit elements or modules 50, preferably made of tantalum, are sputtered directly on each non-conducting element 49. The thin film modules 50 include a plurality of contacts 52 mounted along the resistance path thereof in the same manner as disclosed in relation to the first embodiment. Cover member 54 is identical to cover member 16 of the first embodiment except for the provision of flanges 56 along its periphery in order that it may more easily be mated to the base 42.

It is to be understood that the above two embodiments of the invention are merely illustrative thereof, and the principles of the invention are applicable to other arrangements that will fall within the spirit and scope thereof.

What is claimed is:

1. A thin film power resistor comprising:

a non-conducting base, a plurality of terminals connected to and projecting from one end of said base, a metallic heat sink mounted to said base, a plurality of thin film modules mounted directly on one side of said base, each of said thin film modules having a resistance path, a plurality of first contacts mounted to each of said thin film modules at preselected locations along said resistance path in order that a desired length of the resistance path can be selected by the designation of two of said plurality of contacts, and a plastic cover having a plurality of printed circuit paths and printed second contacts on the bottom side thereof and being affixed to said base for engaging said terminals and said first contacts with said second contacts to connect said desired resistance path length of said thin film modules to said circuit paths, thereby completing a resistance path from one of said terminals, through said printed circuits paths and said desired resistance path length of the film modules, to another of said terminals.

2. A thin film power resistor according to claim 1 wherein:

said first contacts on said thin film modules and said contacts on said bottom side of said cover include conductive adhesives for permanent attachment of said base to said cover.

3. A thin film power resistor according to claim 1 wherein:

said metallic heat sink includes one finned surface and one flat surface, said heat sink being attached to said base so that said finned surface thereof touches the surface of base opposite to that surface having thin film modules thereon.

4. A thin film power resistor comprising:

a ceramic base having an upper surface and a lower surface, a plurality of conductive land areas deposited on said base at one end of said upper surface, a plurality of terminals mounted to said base at said land areas and extending from one end thereof, a plurality of thin film modules sputtered directly on said upper surface of said base, each of said thin film modules having a resistance path, a metallic heat sink mounted to said base, said heat sink having one finned surface and one flat surface, said heat sink being attached to said base with said finned surface touching said lower surface of the base, a plurality of first contacts mounted to each of said thin film modules at preselected locations along said resistance path, in order that a desired length of said resistance path can be selected by the designation of two of said plurality of contacts, and a plastic cover member having a plurality of printed circuit paths and printed second contacts on the bottom side thereof and being affixed to said base for engaging said terminals and said first contacts with said second contacts to connect said desired resistance path length of said thin film modules to said circuit paths, thereby completing a resistance path from one of said terminals, through said printed circuit paths and said desired resistance path length of the film modules, to another of said terminals.

References Cited

UNITED STATES PATENTS

| | | | |
|---|---|---|---|
| 1,754,645 | 4/1930 | Oswald | 339—147 X |
| 2,752,537 | 6/1956 | Wolfe | 339—18 X |
| 2,758,256 | 8/1956 | Eisler | 338—314 X |
| 2,899,676 | 8/1959 | Rivers et al. | 339—18 X |
| 3,056,937 | 10/1962 | Pritikin | 338—308 X |
| 3,071,749 | 1/1963 | Starr | 338—314 |
| 3,239,719 | 3/1966 | Shower | 317—100 X |
| 3,292,241 | 12/1966 | Carroll | 317—101 X |

RICHARD M. WOOD, *Primary Examiner.*

J. G. SMITH, *Assistant Examiner.*